United States Patent
Bofferding et al.

(10) Patent No.: US 8,001,287 B2
(45) Date of Patent: Aug. 16, 2011

(54) DYNAMICALLY UPDATING ALIAS LOCATION CODES WITH CORRECT LOCATION CODES DURING CONCURRENT INSTALLATION OF A COMPONENT IN A COMPUTER SYSTEM

(75) Inventors: Nicholas E. Bofferding, Austin, TX (US); Erlander Lo, Austin, TX (US); Kanisha Patel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1199 days.

(21) Appl. No.: 11/548,068

(22) Filed: Oct. 10, 2006

(65) Prior Publication Data

US 2008/0155368 A1    Jun. 26, 2008

(51) Int. Cl.
*G06F 3/00* (2006.01)
*G06F 1/00* (2006.01)

(52) U.S. Cl. ................. 710/9; 710/10; 713/300

(58) Field of Classification Search ............... 710/9, 10, 710/300, 302; 713/300, 310, 324
See application file for complete search history.

(56) References Cited

U.S. PATENT DOCUMENTS

| | | | | |
|---|---|---|---|---|
| 4,701,878 A | * | 10/1987 | Gunkel et al. | 710/104 |
| 5,935,252 A | * | 8/1999 | Berglund et al. | 713/300 |
| 6,041,364 A | * | 3/2000 | Lortz et al. | 719/321 |
| 6,044,411 A | * | 3/2000 | Berglund et al. | 710/9 |
| 6,148,419 A | | 11/2000 | Ahrens et al. | |
| 6,230,265 B1 | * | 5/2001 | Ahrens et al. | 713/1 |
| 6,243,774 B1 | * | 6/2001 | Eide et al. | 710/302 |
| 6,438,624 B1 | * | 8/2002 | Ku et al. | 710/9 |
| 6,625,728 B1 | | 9/2003 | Ahrens et al. | |
| 6,725,396 B2 | | 4/2004 | Ahrens et al. | |
| 6,961,785 B1 | * | 11/2005 | Arndt et al. | 710/9 |
| 2002/0095625 A1 | | 7/2002 | Ahrens et al. | |
| 2003/0105904 A1 | * | 6/2003 | Abbondanzio et al. | 710/302 |
| 2005/0005269 A1 | | 1/2005 | Zilavy | |
| 2005/0154929 A1 | * | 7/2005 | Ahrens et al. | 713/300 |
| 2005/0160314 A1 | | 7/2005 | Ahrens et al. | |

\* cited by examiner

*Primary Examiner* — Khanh Dang
(74) *Attorney, Agent, or Firm* — Dillion & Yudell LLP

(57) ABSTRACT

During an initial generation/assignment of location codes for field replaceable units (FRUs) that are and/or may be attached to the computer system, the service processor provides an alias location code for each FRU not currently attached. When the service processor later detects a concurrent install of the FRU, the service processor's firmware generates the correct location code from data retrieved from the FRU, and replaces the alias location code stored within the service processor's internal data structures with the correct location code. The firmware also forwards the correct location code back to a serviceability application, and the application utilizes the new location code in all remaining concurrent install commands to maintain a single, consistent view of the system.

18 Claims, 4 Drawing Sheets

DYNAMICALLY UPDATING ALIAS LOCATION CODES WITH CORRECT LOCATION CODES DURING CONCURRENT INSTALLATION OF A COMPONENT IN A COMPUTER SYSTEM

BACKGROUND OF THE INVENTION

1. Technical Field

The present invention generally relates to computer systems and in particular to concurrent installation of components in computer systems. Still more particularly, the present invention relates to a method and system for providing location codes for concurrent installation of components in computer systems.

2. Description of the Related Art

In certain conventional computer systems, information about failed or failing components may be retrieved (or monitored) via a serviceability application, such as Repair and Verify (R&V). The serviceability application may run on a separate hardware management console (HMC). The serviceability application provides a list of hardware resources, such as field replaceable units (FRUs), which are installed within the computer system and other FRUs that may be concurrently installed into the computer system in the future. This list of hardware resources is indexed with corresponding location codes, which are utilized during fault detection and other processes associated with the FRUs.

Typically, faults detected in a hardware resource will cause the service processor's firmware to log errors that describe the problem with the component. One of the data fields recorded in those error logs is the hardware resource's location code. The location code is a unique ASCII string that provides some identification of which component failed and where the component is physically located in the computer system. Armed with an identification of the failed/failing hardware resource and information such as the location code to pinpoint the resource's actual installation location within the computer system, a system manager (or user) is then able to initiate a concurrent upgrade/install procedure for a new FRU.

Among other things, concurrent maintenance procedures (also called "concurrent install") allow customers to add a new FRU to a system, configure and activate the new FRU, and begin using the new FRU within the operating system (OS) processes, all while the system is running and without requiring any system outages. While powerful, the ability to complete this concurrent install creates a problem for the supporting software that is required to report the correct location code information to serviceability applications so that the applications may perform the concurrent hardware install. However, the location code information is generally not available until the system manager performs the concurrent install operation.

This problem arises because, in many cases, the service processor's firmware generates location codes without knowing anything about the hardware that could be later installed at that particular location. For example, the firmware may build the location code for a given GX adapter slot, even if no GX adapter occupies the particular slot at the time the corresponding location code is generated. In some instances, however, the firmware must dynamically build a component's location code from the vital product data (VPD) contained on the component itself, e.g., a VPD of an FRU. The need to build the location code from the VPD presents a problem for concurrent install situations because the service processor's firmware has to first know the correct location code of the future resource to recommend an install location and set the FRU up for operation. However, the firmware does not discover that information until the customer actually performs the install of the resource.

The present invention thus recognizes that a need exists for a mechanism (or method) that effectively addresses the problem of incorrect location code assignments for hardware resources that are concurrently installed at some future time after initial location codes are generated/assigned.

SUMMARY OF THE INVENTION

Disclosed is a method and system for enabling real time generation and assignment of a correct location code for a concurrently-installed hardware resource, when an alias location code is provided as the initial location code by the system's service processor. The service processor generates alias location codes when a serviceability application, such as Repair and Verify (R&V), running on a hardware management console (HMC) requests the location codes of the FRUs that could be installed in the future. In response to this request, the service processor returns alias location codes for the FRUs whose correct location codes are not known prior to a later installation. Then, when the system manager decides to later install the FRU, the R&V application sends the FRU's alias location code (along with other pertinent data) to the service processor to indicate where the hardware will be installed. The R&V application instructs the service processor to activate the FRU. The service processor then discovers the new hardware, calculates the real location code, and propagates the real location code to various internal processes, data structures, and any other components/devices/logic/applications that utilizes the correct location code to correctly reference and access the FRU.

The propagation of the real location code prevents major system components from generating errors due to location code mismatches. After finishing the hardware activation, the service processor informs the R&V application that the FRU's location code has changed. The R&V application then uses the correct location code to complete the remaining concurrent install commands in the concurrent install flow.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
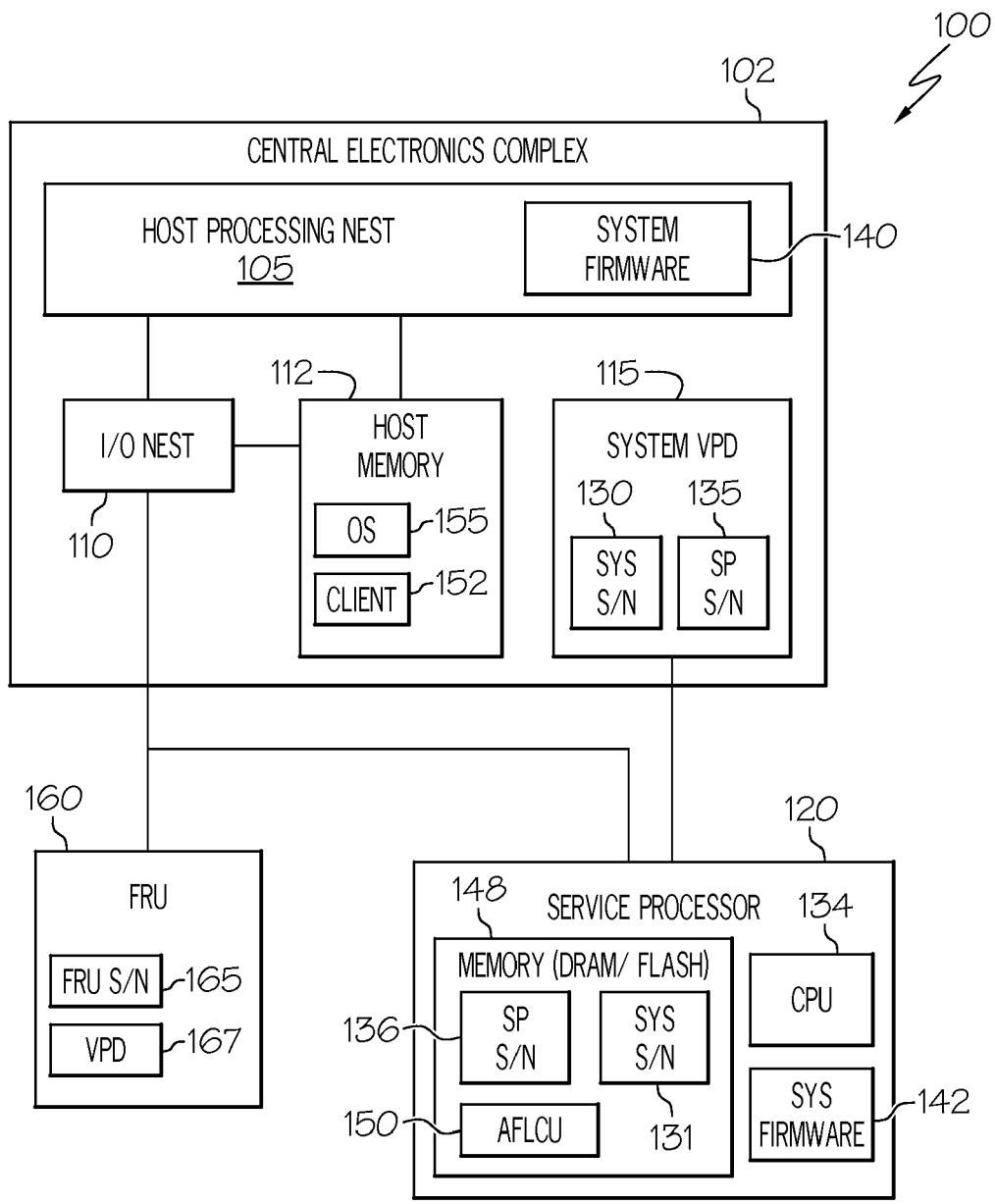
FIG. 1 is an example computer system within which the various features of the invention may advantageously be implemented according to described embodiments of the invention.

The present invention provides a method, system and computer program product for enabling dynamic generation of a correct location code during concurrent installation of a hardware resource, when an alias location code is initially provided by the system's service processor. During an initial generation/assignment of location codes for field replaceable units (FRUs) that are and/or may be attached to the computer system, the service processor provides an alias location code for each FRU not currently attached/connected to the system. When the service processor later detects a concurrent install of the FRU, the service processor's firmware generates the correct location code from data retrieved from the FRU, and replaces the alias location code stored within the service processor's internal data structures with the correct location code. The firmware also forwards the correct location code back to a serviceability application, and the application utilizes the new location code in all remaining concurrent install commands to maintain a single, consistent view of the system.

In the embodiment illustrated by the figures and described in greater details below, the service processor generates alias location codes when a serviceability application, such as Repair and Verify (R&V), running on a hardware management console (HMC) requests the location codes of the FRUs that may be installed in the future. In response to this request, the service processor returns alias location codes for the FRUs whose correct location codes are not known prior to a later installation of the FRU. Then, when the system manager (or user) later decides to install the FRU, the R&V serviceability application sends the FRU's alias location code (along with other pertinent data) to the service processor to indicate where the hardware will be installed. The R&V application instructs the service processor to activate the FRU. The service processor then discovers the new hardware, calculates the real location code, and propagates the real location code to various internal processes, data structures, and any components/devices/logic/applications that utilizes the correct location code to correctly reference and access the FRU.

The propagation of the real location code prevents major system components from generating errors due to location code mismatches. After finishing the hardware activation, the service processor informs the R&V application that the FRU's location code has changed. The R&V application then updates the alias location code to the correct location code and uses the correct location code to complete the remaining commands in the concurrent install flow.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIGS. 1 and 2xx for FIG. 2). The specific numerals assigned to the elements are provided solely to aid in the description and not meant to imply any limitations (structural or functional) on the invention.

Certain terms are provided and utilized within the description of the invention. These terms and their corresponding definitions include the following:

CM (Concurrent Maintenance): Installing, repairing, or removing hardware while a computer system is running;

HMC (Hardware Management Console): A standalone console which interfaces and controls one or more computer systems via a network connection to the computer's service processor(s) (on which the code for the R&V application runs);

R&V (Repair and Verify): An application running on an HMC which guides a system manager through a concurrent hardware repair or upgrade of the computer system's resources;

Computer system: A system comprising one or more nodes hosting CPU/memory/IO resources, as well as one or more service processors to boot and provide additional services for the one or more nodes (see FIG. 1)

VPD (Vital Product Data): Critical information about a particular piece of hardware that is stored in an embedded module;

FRU (Field Replaceable Unit): The smallest separate entity in a computer system that can be replaced in a service action; and CM Service Lock: A software lock managed by the service processor to serialize access to concurrent maintenance functions.

It is understood that the use of specific terms and/or parameter names are for example only and not meant to imply any limitations on the invention. The invention may thus be implemented with different nomenclature/terminology utilized to describe the above and other parameters, without limitation.

With reference now to the figures, FIG. 1 depicts a block diagram representation of a computer system within which features of the invention may be advantageously implemented. Computer system 100 comprises Central Electronics Complex (CEC) 102, which includes host processor nest 105, an Input/Output (I/O) nest 110, host memory 112 and system Vital Product Data (VPD) 115. Host processor nest 105 is illustrated having system firmware 140. During system operation, system firmware 140 is loaded into host memory 112 and executed by one or more processors within host processor nest 105. System VPD 115 contains system Serial Number (S/N) 130 and service processor (SP) S/N 135, which is the SN of the SP that last communicated with system firmware 140.

In addition to the above components, computer system 100 further comprises at least one SP, namely SP 120, which is connected to I/O nest 110 and system VPD 115. SP 120 comprises dedicated CPU 134 and memory 148 (e.g., flash or DRAM), which stores various SP utilities and other SP information, including: (a) the SP's own S/N 131; (b) last system S/N 136, which is the S/N of the system that SP 150 was plugged into the last time SP 150 was powered on; and (c) AFLCU utility 150, which is described below. Additionally, SP 120 comprises SP system firmware 142, which performs several of the functional features described herein and generally attributed to SP 120. SP 120 is utilized to control components within CEC 102 and also to initialize and bring online FRUs that are later connected to CEC 102 during a concurrent install operation. FIG. 1 also depicts an example FRU 160, which is connected to I/O nest 105 and system VPD 115. FRU 160 may be any device that is able to connect to an I/O port of I/O nest 105 and operate with components of CEC 102.

Those of ordinary skill in the art will appreciate that the hardware depicted in FIG. 1 may vary. For example, other peripheral devices, such as optical disk drives and the like, also may be used in addition to or in place of the hardware depicted. Thus, the depicted example is not meant to imply architectural limitations with respect to the present invention. Computer system 100 may be described as a specific configuration of computer systems; However, the features of the invention are fully applicable to any computer system and is not limited to that described configuration of computer system 100. Thus computer system 100 may be, for example, an IBM eServer pSeries system, a product of International Business Machines Corporation in Armonk, N.Y.

As shown in FIG. 1, in addition to the above described hardware components, CEC 102 further comprises a number of software components, including operating system (OS) 155 (e.g., Advanced Interactive Executive (AIX®), a trademark of International Business Machines Corporation, or GNU®/Linux®, registered trademarks of the Free Software Foundation and The Linux Mark Institute) and one or more software applications, including client utility 152. Client utility 152 controls the Activate Power Domain processes for providing power to various components/devices, such as FRU 160, as described below.

Additionally, various features of the invention are provided as software instructions stored within SP memory 148 and executed by SP's CPU 134. Among the software instructions that are specific to the invention are instructions for enabling the generation of an alias location code and instructions for subsequently determining the correct location code of a connected FRU and updating the system with the correct location code. For simplicity, the collective body of code that enables the above location code features is referred to as "Automatic FRU Location Code Updating" (AFLCU) utility. In actual implementation, the AFLCU utility may be added to existing service processor operating code (or firmware) to provide the various functions described below.

In implementation, AFLCU utility 150 is executed on CPU 134. According to the illustrative embodiment, when SP's CPU 134 executes AFLCU utility 150, AFLCU utility 150 enables computer system 100 (FIG. 1) and specifically subsystem 200 (FIG. 2) to complete various functional processes, including those features and functions described below and illustrated by FIGS. 3-5.

Figure 2:
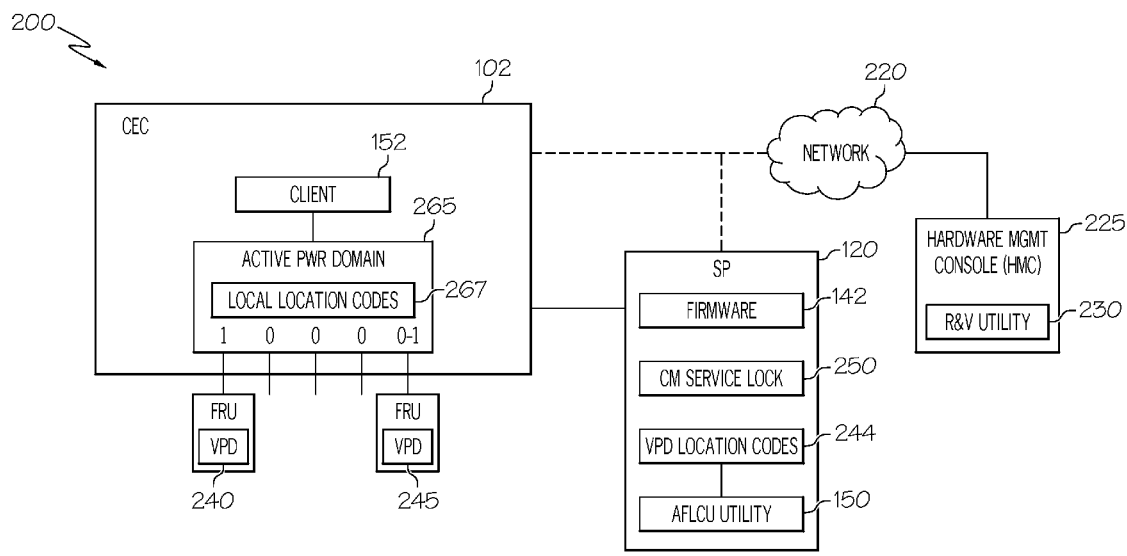
FIG. 2 is an expanded view of various specific hardware and software resources within a sub-system for updating location codes utilized by computer system of FIG. 1, according to the illustrative embodiments of the invention.

Turning specifically now to FIG. 2, there is illustrated a bock diagram representation of an example subsystem within which a correct location code of an FRU is generated and the FRU is currently installed and provided power, according to an illustrative embodiment. As shown, CEC 102 includes a series of software logic components, namely client 152, which is connected to Activate Power Domain 265. Activate Power Domain 265 controls the supply of power to the FRUs from the main power supply of CEC 102. Two FRUs are illustrated connected to respective ones of a plurality of power ports. A first FRU, legacy FRU 240 is assumed to be connected to CEC 102 at the time the system sets up (or generates) the initial set of location codes, including the alias location codes for FRUs that may be connected at a future time. These location codes are stored within local location codes table 267 and also maintained within R&V application 230. The second FRU, new FRU 245, is assumed to be connected to CEC 102 at some future time after the initial set of location codes has been established. Each FRU 240, 245 includes a corresponding VPD.

When an FRU is connected to one of the power ports of Activate Power Domain 265, a sequence of processes involving client 260 and SP 120, enables power to be supplied to the FRU through the port. Within Activate Power Domain 265, a first port to which legacy FRU 240 is connected, is labeled with logic "1". This logic 1 labeling indicates which ports have a connected and functional FRU (i.e., an installed FRU that is receiving power from the Activate Power Domain). Meanwhile logic "0" indicates that no FRU is connected to the other ports. These ports are initially assigned an alias location code, as described herein. Notably, the port of new FRU 245 is shown as transitioning from logic 0 to 1 as the new FRU is connected and undergoes the process of a concurrent install, wherein new FRU 245 is initialized and set up to receive power after assignment of the correct location code. This process is described in further details below.

Also illustrated by FIG. 2 is an expanded view of the relevant software constructs within SP 120, which includes, in addition to firmware 142, the code for AFLCU utility 150, VPD location codes 244, and CM service lock 250. AFLCU 150 resides on the SP's memory (FLASH/DRAM) and executes on dedicated SP CPU 134. Firmware 142 interacts with the CEC hardware and software and specifically client 152 when carrying out AFLCU functions. More detailed descriptions of the use of these software components are provided below.

Coupled to SP 120 via network 220 is HMC 225 from which several of the features of the invention may be activated/initiated. HMC 225 includes R&V utility 230, which is one example of the different serviceability applications that may be provided within HMC 225. In the described embodiments, R&V utility 230 (also referred to herein as R&V application 230) completes the specific functions within the description of the invention that are attributed to HMC 225. The method by which the illustrated components interact within the overall system 200 to provide the location code updating features of the invention is described within the descriptions of the flow charts.

Figure 3:
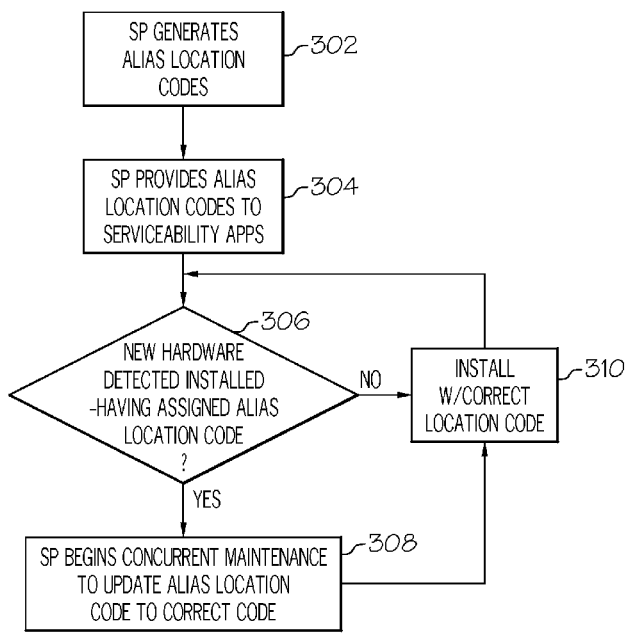
FIGS. 3-5 are flow charts of various parts of the process by which a hardware resource is concurrently installed to the computer system and the correct location code of the hardware resource is generated and propagated to various components within the computer system, in accordance with described embodiments of the invention.
Figure 4:
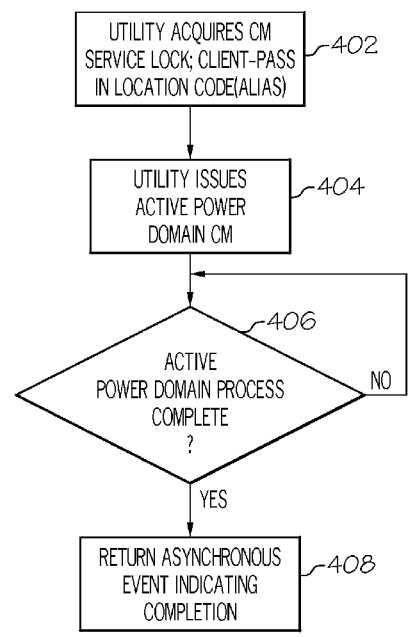
Figure 5:
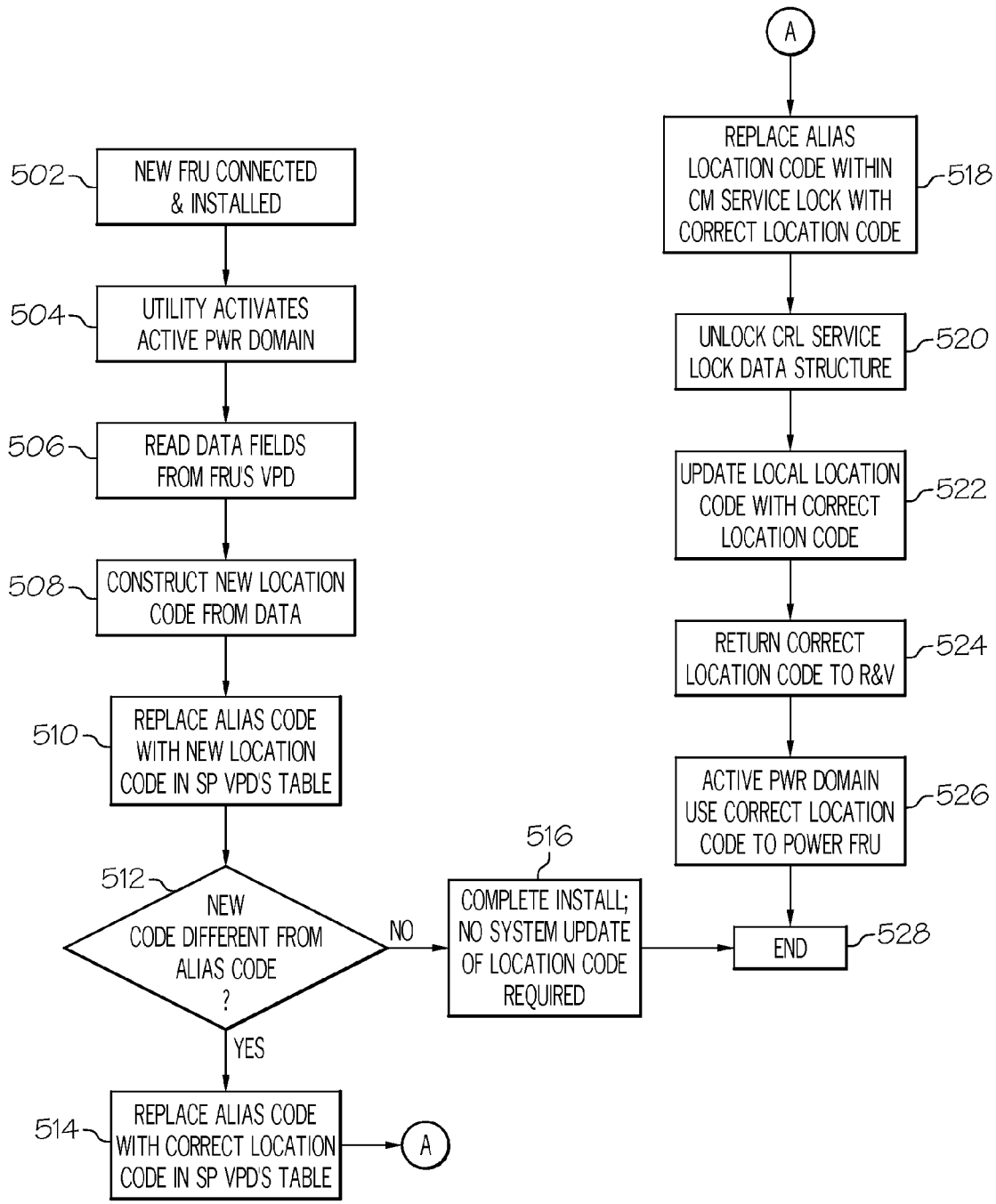

FIGS. 3-5 are flow charts illustrating various portions of the overall set of processes completed by the AFLCU utility 150 and other components within system 200 to enable new FRU 245 to be concurrently installed on system 200, according to the illustrative embodiments. FIG. 3, in particular, describes the process of generating and assigning the alias location code in response to an initial query from R&V application 230. The process begins at block 302, at which service processor firmware 142 generates an alias location code for each (later-added) FRU whose location code must be dynamically generated during actual device installation.

According to the illustrative embodiment, the aliases are always predefined by system platform so that the alias is not dependent on any information contained within the FRU to be installed. As provided at block 304, service processor 120 provides responses to query commands for serviceability applications, such as R&V application 230 running on HMC 225, to read information about FRUs that may be installed in the future. This information includes the alias location code for such hardware. A determination is made at block 306 whether a user/system manager later decides to install hardware referenced by an alias location code. If such an install is desired, R&V application 230 instructs service processor 120 to begin a concurrent maintenance procedure for the specific FRU to be installed, as shown at block 308.

FIG. 4 illustrates the process by which AFLCU utility 150 replaces the initial alias location code with the real location code. To serialize access to concurrent maintenance functions, service processor 120 maintains a software lock, referred to herein as "CM Service Lock" 250. As shown at block 402, client 152 acquires CM Service Lock 250 at the start of a CM operation by passing in a location code (in addition to other information/data). Since client 152 sends the same location code for all other CM commands in the concurrent install procedure, one important requirement of the invention is that the client's location code matches the location code contained in CM Service Lock 250 (i.e., the CM location code). Another important requirement is that both the client's location code and the CM location code reference the most accurate (i.e., correct) location code for the FRU being installed.

Returning to the description of the figure, after acquiring CM Service Lock 250 by sending an alias location code (block 402), client 260 issues the "Activate Power Domain" command, as shown at block 404. This Activate Power Domain command activates the main initialization routines to bring a newly installed resource (e.g., FRU 245) online. When the Activate Power Domain command is triggered, as determined at block 406, the procedure returns an asynchronous event to the R&V application 230 to indicate whether the command completed successfully or not, as shown at block 408. Successful completion of the command indicates that the FRU was properly installed and is receiving power.

FIG. 5 now illustrates the process by which AFLCU utility 150 (operating along with client 152, which controls the Activate Power Domain command) replaces a FRU's alias location code with its real location code. Within the description, certain processes provided by execution of AFLCU utility 150 triggers execution of other processes, such as the operations of client 152. For clarity in the description, the majority of processes are described as being completed by AFLCU utility 150, although it is appreciated that other components may assist in completing the secondary processes of AFLCU utility 150.

The process depicted by FIG. 5 begins at block 502, which illustrates the system manager and initiating the installation of a new FRU (e.g., FRU 245) using R&V application 230. In the described embodiment, this installation is triggered by the system manager connecting the FRU to one of the system's ports. The R&V application 230 then instructs the service processor to activate the FRU, and the R&V application 230 forwards the alias location code within the activation request. On detection of the new FRU's installation, client 260 initiates "Activate Power Domain" command processing, as indicated at block 504.

When the service processor receives the activation request with the alias location code, service processor executes AFLCU utility 150, which reads relevant data fields from the VPD module of the newly installed FRU, as shown at block 506. Then, as depicted at block 508, AFLCU utility 150 utilizes the information from the data fields to dynamically construct/generate the correct location code. After constructing/generating the correct location code, AFLCU utility 150 replaces the alias location code in the service processor's internal VPD tables 144 with the correct location code, as provided at block 510. AFLCU utility 150 determines, at block 512, if the correct location code is different from the alias location code. If the correct location code is not different, then AFLCU utility 150 enables client 152 and firmware to complete the concurrent installation without updating the (alias) location code, as shown at block 516.

However, if the correct location code is different from the alias location code, then AFLCU utility first replaces the alias location code in VPD location codes table 244 with the correct location code, as provided at block 514. Following, at block 518, AFLCU utility 150 locks the CM Service Lock data structure (250) and replaces the alias location code within the CM Service Lock data structure (250) with the correct location code. According to the invention, this replacement is necessary to prevent failure of all future CM commands, since the CM Service Lock's location code would otherwise not match the location codes within the VPD tables. The replacement process further requires locking the CM Service Lock data structure to ensure atomic updates.

Once AFLCU utility 150 completes the update to the CM Service Lock data structure, AFLCU utility 150 unlocks the CM Service Lock data structure, as shown at block 520. Additionally, since local location code table 267 inside the Activate Power Domain command also contains the alias location code, AFLCU utility 150 updates the local location code table 267 (or CM location code) to the correct location code, as shown at block 522. This updating of the local location code table 267 ensures that future operations within the currently executing Activate Power Domain command instance do not conflict with the now updated CM Service Lock 250.

After the FRU has been initialized, AFLCU utility 150 returns the new location code to R&V 230 in an Activate Power Domain Command Completed asynchronous event, as shown at block 524. The Activate Power Domain command then utilizes the new location code (instead of the alias) for the remaining commands in the CM flow, including providing power to the FRU, as indicated at block 526. By utilizing the new location code, Activate Power Domain 265 thus avoids conflicts with the updated CM Service Lock 250. The Activate Power Domain command processing and the concurrent install operation then end at termination block 528.

In addition to the methods described above, extensions of the invention involve use of different methods in certain situations. Two such methods are now provided:

In a first, simpler approach, the alias location code is utilized in all circumstances, even when the real location code may be determined. This solution works on some levels but may introduce problems with respect to serviceability. Since the location code would frequently be incorrect, any error logs generated due to faults within the hardware referenced by the alias would not be reported correctly.

In a second approach, service processor's firmware 142 simply maintains a mapping of alias location codes to real location codes (as the real location codes are dynamically discovered) during and after the concurrent install. This second approach is better than the first approach from a functional standpoint. However, the second approach requires much more complexity in the design, since all relevant components have to be able to handle mappings of multiple location codes and corresponding alias location codes.

Given the above approaches and the conventional methods, certain advantages are recognized when implementing the invention. Three of these advantages include: (1) The application of the present invention is local in scope, which reduces system complexity. The code implementation affects only a small number of internal components, compared to the second alternative method, described above, which is pervasive in nature; (2) The application achieves the highest possible location code accuracy, as the algorithms update all components that utilize the location code as soon as the correct location code is determined. The level of accuracy surpasses that provided by the above described first alternative method; (3) Finally, application of the invention ensures error reporting will provide accurate serviceability information for any failures tied to the newly installed hardware.

The invention solves the problem found with existing concurrent maintenance procedures, which allow the addition of new hardware field replaceable units (FRUs) to a system while the system is running. The computer system is thus able to activate the FRUs and begin using the FRUs within operating systems, all without requiring any system outages. The invention eliminates the problem of requiring the firmware to report the correct location code information to serviceability applications before the applications would support/perform a concurrent hardware install, by providing an alias location code to trigger the concurrent install and then dynamically updating the alias location code with the correct location code both within the service processor as well as within the serviceability application.

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. In a computer system having a service processor (SP), system firmware, and an Activate Power Domain that controls allocation of power to connected hardware devices, a method comprising:
   generating, via service processor firmware, a different alias location code for each device whose correct location code is dynamically generated during concurrent installation at a future time, wherein said alias location code is predefined by system platform and is not dependent on information contained within the device that is later installed;
   assigning a generated alias location code for a device that may be later connected to the computer system; and
   when the device is later connected during a concurrent installation process:
      automatically determining a correct location code of the device; and
      dynamically replacing the generated alias location code with the correct location code at each system component and process that utilizes the device's correct location code to complete the concurrent installation and subsequent operations involving the device.

2. In a computer system having a service processor (SP), system firmware, and an Activate Power Domain that controls allocation of power to connected hardware devices, a method comprising:
   assigning an alias location code for a device that may be later connected to the computer system;
   when the device is later connected during a concurrent installation process:
      automatically determining a correct location code of the device; and
      dynamically replacing the alias location code with the correct location code at each system component and process that utilizes the device's correct location code to complete the concurrent installation and subsequent operations involving the device; and
   in response to receipt of a query from a repair and verify (R&V) serviceability application that requests information about the devices that are installed and other devices that may be later installed, providing a reply message to the serviceability application that includes the alias location codes for each of the other devices that may be later installed.

3. The method of claim 2, wherein, when a concurrent installation is requested for one of the other devices, said automatically determining a correct location code comprises:
   detecting a physical coupling of the device;
   reading relevant data fields from a vital product data (VPD) module of the device; and
   dynamically constructing the correct location code using information from the data fields.

4. In a computer system having a service processor (SP), system firmware, and an Activate Power Domain that controls allocation of power to connected hardware devices, a method comprising:
   assigning an alias location code for a device that may be later connected to the computer system; and
   when the device is later connected during a concurrent installation process:
      automatically determining a correct location code of the device; and
      dynamically replacing the alias location code with the correct location code at each system component and process that utilizes the device's correct location code to complete the concurrent installation and subsequent operations involving the device;
   wherein said dynamically replacing the alias location code comprises:
      replacing the alias location code in the SP's internal VPD location table with the correct location code;
      determining if the correct location code is different from the alias location code; and
      when the correct location code is different from the alias location code:
         locking a CM Service Lock data structure to ensure atomic updates;
         replacing the alias location code within the CM Service Lock data structure with the correct location code; and
         unlocking the CM Service Lock data structure.

5. The method of claim 4, further comprising:
   updating a local location code table of the Activate Power Domain to the correct location code;
   automatically initiating Activate Power Domain command processing utilizing the correct location code; and
   activating power to the device from the Activate Power Domain utilizing the correct location code received from the local location code table, wherein the device is powered for operation at a correct location at which the device is connected.

6. The method of claim 5, wherein said automatically initiating comprises:
   receiving, at a CM Service Lock of the SP, required information that includes a location code required by CM Service Lock operation to initiate concurrent maintenance functions, wherein said SP serializes access to concurrent maintenance functions by maintaining the CM Service Lock;
   enabling a client process to acquire the CM Service Lock at the start of a CM operation by passing in the required information to the SP including the location code;

when the CM Service Lock receives a correct location code for the device and is acquired by the client process, issuing an Activate Power Domain command to activate initialization routines that bring the device online; and when the initialization routines of the device completes:
  forwarding the correct location code to the R&V application in an "Activate Power Domain command completed" asynchronous event to replace the alias location code at the R&V application; and
  enabling the Activate Power Domain command to utilize the correct location code for subsequent commands in a CM flow, including providing power to the FRU.

7. A computer program product comprising:
a computer readable medium; and
program instructions on the computer readable medium that when executed by a service processor of a computer system completes the following processes:
  generating, via service processor firmware, a different alias location code for each device whose correct location code is to be dynamically generated during a concurrent installation at a future time, wherein said alias location code is predefined by system platform and is not dependent on information contained within the device that is later installed;
  assigning a generated alias location code for a device that may be later connected to the computer system; and
  when the device is later connected during a concurrent installation process:
    automatically determining a correct location code of the device; and
    dynamically replacing the generated alias location code with the correct location code at each system component and process that utilizes the device's correct location code to complete the concurrent installation and subsequent operations involving the device.

8. The computer program product of claim 7, wherein said program instructions for assigning further comprises instructions for:
  in response to receipt of a query from a repair and verify (R&V) serviceability application that requests information about the devices that are installed and other devices that may be later installed, providing a reply message to the serviceability application that includes the alias location codes for each of the other devices that may be later installed.

9. The computer program product of claim 7, wherein, when a concurrent installation is requested for one of the other devices, said program instructions for automatically determining a correct location code comprises instructions for:
  detecting a physical coupling of the other device;
  reading relevant data fields from a vital product data (VPD) module of the other device; and
  dynamically constructing the correct location code using information from the data fields.

10. The computer program product of claim 7, wherein said program instructions for dynamically replacing the alias location code comprises instructions for:
  replacing the alias location code in the SP's internal VPD location table with the correct location code;
  determining if the correct location code is different from the alias location code; and
  when the correct location code is different from the alias location code:
    locking a CM Service Lock data structure to ensure atomic updates;
    replacing the alias location code within the CM Service Lock data structure with the correct location code; and
    unlocking the CM Service Lock data structure.

11. The computer program product of claim 10, further comprising instructions for:
  updating a local location code table of the Activate Power Domain to the correct location code;
  automatically initiating Activate Power Domain command processing in response to the update with the correct location code; and
  activating power to the device from the Activate Power Domain utilizing the correct location code received from the local location code table, wherein the device is powered for operation at a correct location at which the other device is connected.

12. The computer program product of claim 11, further comprising:
  receiving, at a CM Service Lock of the SP, information that includes a location code required by CM service lock operation to initiate concurrent maintenance functions, wherein said SP serializes access to concurrent maintenance functions by maintaining the CM Service Lock;
  enabling a client process to acquire the CM Service Lock at the start of a CM operation by passing in the required information, which includes the correct location code;
  when the CM Service Lock receives a correct location code for the device and is acquired by the client process, issuing an Activate Power Domain command to activate initialization routines that bring the other device online; and
  when the initialization routines of the device completes:
    forwarding the correct location code to the R&V application in an "Activate Power Domain command completed" asynchronous event to replace the alias location code at the R&V application; and
    enabling the Activate Power Domain command to utilize the correct location code for subsequent commands in a CM flow, including providing power to the FRU.

13. A system comprising:
a service processor (SP) having a dedicated processor and service processor firmware;
a collection of interconnected components, including a processor, memory, and an input/output (I/O) connector that are coupled to and monitored and controlled by the SP;
an interconnect and processing logic for concurrently installing a device to the collection of interconnected components; and
a location code updating (AFLCU) utility that is executed by the dedicated processor of the SP to provide the following functional processes:
  generating, via service processor firmware, a different alias location code for each device whose correct location code is to be dynamically generated during a concurrent installation at a future time, wherein said alias location code is predefined by system platform and is not dependent on information contained within the device that is later installed;
  assigning a generated alias location code for a device that may be later connected to the computer system; and
  when the device is later connected during a concurrent installation process:
    automatically determining a correct location code of the device; and dynamically replacing the alias location code with the correct location code at each system component and process that utilizes the device's correct location code to complete the concurrent installation and subsequent operations involving the device.

14. The system of claim 13, wherein said assigning is provided by program instructions of the AFLCU utility, which further comprises:
program instructions for, in response to receipt of a query from a repair and verify (R&V) serviceability application that requests information about the devices that are installed and other devices that may be later installed, providing a reply message to the serviceability application that includes the alias location codes for each of the other devices that may be later installed.

15. The system of claim 14, wherein said AFLCU utility further comprises:
program instructions for receiving a concurrent installation request for one of the other devices;
program instructions for detecting a physical coupling of the other device; and
program instructions for completing said automatically determining a correct location code by:
reading relevant data fields from a vital product data (VPD) module of the other device; and
dynamically constructing the correct location code using information from the data fields.

16. The system of claim 13, wherein the program means within the AFLCU utility for dynamically replacing the alias location code further comprises:
program instructions for replacing the alias location code in the SP's internal VPD location table with the correct location code;
program instructions for determining if the correct location code is different from the alias location code; and
when the correct location code is different from the alias location code:
program instructions for locking a CM Service Lock data structure to ensure atomic updates;
program instructions for replacing the alias location code within the CM Service Lock data structure with the correct location code; and
program instructions for unlocking the CM Service Lock data structure.

17. The system of claim 16, wherein:
said collection of interconnected components includes an Activate Power Domain that controls allocation of power to one or more connected devices; and
said AFLCU utility further comprises:
program instructions for updating a local location code table of the Activate Power Domain to the correct location code;
program instructions for automatically initiating Activate Power Domain command processing in response to the update with the correct location code; and
program instructions for activating power to the device from the Activate Power Domain utilizing the correct location code received from the local location code table, wherein the device is powered for operation at a correct location at which the other device is connected.

18. The system of claim 17, wherein said program instructions for automatically initiating comprises:
program instructions for receiving, at a CM Service Lock of the SP, information that includes a location code required by CM service lock operation to initiate concurrent maintenance functions, wherein said SP serializes access to concurrent maintenance functions by maintaining the CM Service Lock;
program instructions for enabling a client process to acquire the CM Service Lock at the start of a CM operation by passing in the required information, which includes the correct location code;
when the CM Service Lock receives a correct location code for the device and is acquired by the client process, program instructions for issuing an Activate Power Domain command to activate initialization routines that bring the other device online; and
when the initialization routines of the device completes:
program instructions for forwarding the correct location code to the R&V application in an "Activate Power Domain command completed" asynchronous event to replace the alias location code at the R&V application; and
program instructions for enabling the Activate Power Domain command to utilize the correct location code for subsequent commands in a CM flow, including providing power to the FRU.

* * * * *